Feb. 16, 1965
F. KÖHL
3,169,450
HYDRAULIC CONTROL DEVICE
Filed Nov. 26, 1963
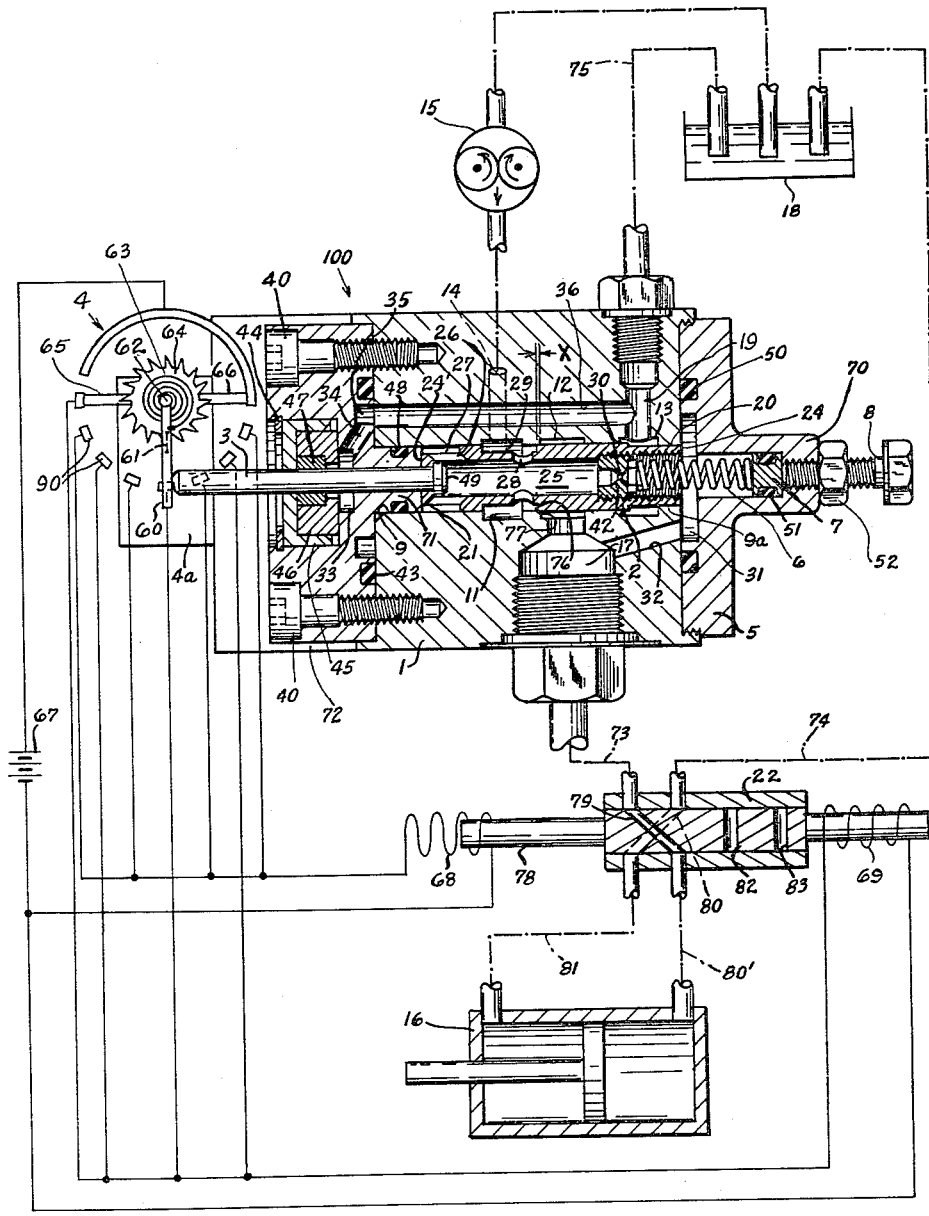
FRANZ KÖHL
INVENTOR.
BY Mestern, Ross & Mestern United States Patent Office 3,169,450
Patented Feb. 16, 1965

3,169,450
HYDRAULIC CONTROL DEVICE
Franz Köhl, Frankfurt-Sindlingen, Germany, assignor to Alfred Teves Maschinen- und Armaturenfabrik K.G., Frankfurt am Main, Germany, a corporation of Germany
Filed Nov. 26, 1963, Ser. No. 325,960
Claims priority, application Germany, Dec. 19, 1962, T 23,229
9 Claims. (Cl. 91—28)

My present invention relates to hydraulic devices and, more particularly, to control systems for hydraulic installations adapted to operate a valve means therefor.

It is known to provide, in hydraulic installations comprising a source of fluid under pressure and a working element operated by the fluid, a control device or unit co-operating with a valve means interposed between the source and the working element for periodically reversing the flow of fluid to the latter and effecting reciprocation of its operating member. Thus, when the working element is a hydraulic cylinder, the valve can have two operating positions wherein the working piston of the hydraulic cylinder is alternately driven in opposite directions by the fluid passed through the valve. In installations of this type, the valve can be electromagnetically operable and co-operate with a control device for generating control pulses adapted to trigger the valve from one position into another.

It is the principal object of the present invention to provide an improved control device for a system of the character described.

Still another object of this invention is to provide a hydraulic system wherein a bistable valve is operable via a control unit to reverse periodically the flow of fluid under pressure to a hydraulic working element such as a hydraulic cylinder.

These objects, and others which will become apparent hereinafter, are attained in accordance with the present invention by providing, in a hydraulic installation comprising a source of fluid under pressure, and valve means operable to regulate the flow of fluid and a fluid-responsive working element, a control unit connected to the source and provided with a movable piston member displaceable by a fluid-pressure differential thereacross for intermittently operating the valve means. According to one feature of this invention, the piston member simultaneously functions as a valve which, in one operating position, blocks substantial flow of fluid to the working element until the pressure differential results in a displacement of this member into its second position wherein a primary fluid path is opened between the source and the working element for the relatively high-rate flow of fluid thereto. The pressure differential can be derived by bleeding fluid pressure into the chamber connected with the working element on one side of the piston member from a cylinder chamber on the other side of the piston member via throttle means whereby the presure differential between these chambers and across the piston member effects displacement of the latter.

It is an important feature of the present invention that the pressure differential shifting the piston member from one extreme position to the other is applied against the force of resilient restoring means, e.g. a restoring spring, which normally biases the piston member in the opposite direction.

Thus, the control unit can be so constructed that, when the valve member is shifted by the pressure differential from its first position to its second position, the pressure within the cylinder chambers is equalized and the pressure differential is reduced to zero. Under these circumstances, the resilient means, which preferably has an adjustable restoring force, displaces the piston member from its second position into its first position to generate a control pulse which can be transmitted to the valve means. The piston member can, in this case, be provided with a ram or transmission rod for direct or indirect actuation of the valve means, the rod constituting all or part of a transmission means for triggering the valve means.

According to a more specific feature of this invention, the control unit is provided with switch means while the valve means is electromagnetically operable by the switch means, the transmission rod or ram being directly coupled with the switch means or in actuating relationship therewith. One possible arrangement is a ram or piston member constituting the armature of an induction coil in which a current pulse is generated upon reciprocation of the piston member to operate electronic switch means and through the latter, in turn, the electromagnetically operable valve means. The switch means in the present case may be constituted in a similar manner, with the ram constituting a magnetic armature for inducing a pulse in an induction coil. It is, however, preferable with the control unit of the present invention to operate an electromechanical switch upon reciprocation of the ram. This switch, which can be mounted directly upon the housing of the control unit, is stepped by the ram and periodically actuates the electromagnetic valve means to reverse the latter. This valve means can have a pair of electromagnetic coils or solenoids, operable to displace the valve member into respective extreme positions, and circuit means connecting the electromechanical switch with these coils to alternately energize them upon successive reciprocations of the valve member.

The above and other objects, features and advantages of the present invention will become more readily apparent from the following detailed description, reference being made to the accompanying drawing whose sole figure is an axial cross-sectional view of a control system embodying the invention and diagrammatically illustates the remainder of the hydraulic installation and the control means therefor.

In the drawing, I show a hydraulic system which comprises a source 15 of fluid under presure, a reservoir or sump 18, a working element or load such as a hydraulic cylinder 16, and an electromagnetically operable two-position valve 22. The control unit 100 interposed between the source 15 of fluid under pressure and the working element comprises a housing 1 within which a tubular piston-and-valve member 2 is axially shiftable by pressure differential. Piston member 2 receives a ram 3 whose head 49 bears against the left-hand inner wall of piston 2 and engages a switch mechanism generally designated 4 and mounted on a support plate 4a secured to housing 1. At the right-hand end of the control unit, a cover plate 5 is threaded onto the housing 1 and provides a compartment 31 serving as part of one of the piston chambers for the piston member 2. Plate 5 has a tubular boss 70 in which is received a coil spring 6 and a sliding seat 7 against which this spring bears. An annular seal 51 prevents leaking of fluid past the abutment 7 which can be shifted axially by the screw 8 to increase or decrease the restoring force applied by spring 6 to the piston member 2, a nut 52 being proivded to lock screw 8 in any desired position. Another seal 50, surrounding compartment 31, is interposed between the plate 5 and the right-hand face of housing 1 to prevent leakage of the fluid.

The housing 1 is provided with an axial valve bore 9 in which the piston member 2 is sliding displaceable, the bore 9 being closed at its left-hand extremity by an annular seal 48 of a boss 71 extending axially into the bore 9 from another cover plate 72 affixed by bolts 40 to the left-hand face of housing 2, an annular seal 43 being provided to prevent leakage at this face. Boss 71 forms an axial guide for the ram 3. Plate 72 is provided with a further guide bushing 47 for the ram, this bushing being received within a sealing sleeve 46 which in turn is mounted in a recess of a further bushing 45 axially fixed in the plate by a snap ring 44. Bore 9 is provided with a plurality of annular recesses or grooves axially spaced therealong, including control grooves 11 and 12, whose functions will be described subsequently, and a further groove 13 which is connected to the reservoir 18 and thus maintains atmospheric pressure and serves as a collector for any fluid tending to leak past the piston member 2.

A radial bore 14 in housing 1 connects the groove 11 with fluid-pressure source 15 while another radial bore 17 connects control groove 12 with the inlet conduit 73 of valve 22 whose discharge conduit 74 returns fluid to the reservoir 18. Groove 13 is connected to the reservoir via a conduit 75 and a radial bore 19.

Each end of the piston member 2 is formed with a respective annulus 20 and 21. The bore 9 is provided with a section 9a of reduced diameter to serve as a guide for the annulus 20. Annulus 21 has a diameter still smaller than the diameter of section 9a while the diameter of the annulus or step 20 of piston member 2 is so chosen that the cross-section of the valve bore 9, minus the cross-section of the ram 3, is equal to the cross-section of the face 24 of annulus 20 against which the spring 6 bears.

The tubular valve member 2 has its interior 25 communicating with a radial bore 26 and, via this bore, with an annular compartment 27 formed between the wall of bore 9 and the piston member 2 at annulus 21. Within the interior of the piston member, there is provided a bushing 42 formed with an axial throttling bore 30 establishing communication between chamber 31 and the interior 25 of the valve member, this chamber 31 being connected to the outlet 17 via a passage 32. Another chamber 33 at the opposite axial end of the unit surrounds the ram 3 and collects any fluid leaking past this ram for return to the reservoir 18 via passages 34, 35 and 36, passage 35 being formed as an annular groove in the face of plate 72. The piston member 2 is provided with an annular groove 29 registering with groove 11 and communicating with the interior of the piston member via radial bores 28, the right-hand flank of groove 29 being formed as a control edge 76 overlapping the left-hand edge 77 of groove 12 by an axial distance $x$ in one extreme position of the piston member 2. In this position, the ram 3 operates the electrical switch 4. While any switch means performing a similar function will serve for the purpose of the present invention, the switch 4 is here shown to comprise an actuating arm 60 displaceable by ram 3 for stepping a ratchet wheel 64 by means of a pawl 61 against the force of a restoring spring 63 which tends to return the arm 60 counterclockwise upon its pivotal movement by ram 3 about axis 62. Pawl 61 is carried by arm 60 in the usual manner while wipers 65 and 66, affixed to ratchet wheel 64, alternately engage contacts 90 connected in circuit with the electromagnetic coils 68 and 69 of valve 22. The coils 68 and 69 are returned to a source of electrical potential such as a battery 67.

The valve 22 is provided with an axially shiftable valve member 78 which simultaneously constitutes the armatures for coils 68 and 69, this valve member having passages 79 and 80 for connecting the pressure line 73 of valve 22 with a conduit 80' of hydraulic cylinder 16 and the reservoir line 74 of valve 22 with a conduit 81 of the cylinder. In addition, the valve member has passages 82 and 83, shifted into operative position upon displacement of valve member 78, for connecting the pressure line 73 with conduit 81 and reservoir line 74 with conduit 80'.

In the position of control unit 100 illustrated in the drawing, control edges 76 and 77 overlap so that fluid is fed under pressure from pump 15 into groove 11 and thus into the interior 25 of piston member 2. The valve member 78 is in the position illustrated while a similar stream of pressure fluid flows from the interior of the piston member 2 through the throttle bore 30 into compartment 31 from which it is fed via passage 32, conduit 73, bore 79 and conduit 80' to the right-hand compartment of hydraulic cylinder 16. A pressure differential is thus established across the valve member 2, which is shifted to the right against the force of spring 6 to draw the ram 3 to the right into a preparatory position whence it can actuate switch 4 upon the next displacement of the ram to the left. As the piston member 2 shifts to the right, edges 76 and 77 no longer overlap and a direct path is established between grooves 11 and 12 whereby a high-volume flow of fluid passes from pump 15 into grooves 11 and 12 and thence into passage 17 from which it is fed to conduit 80' of hydraulic cylinder 16 whereupon the piston of the latter is shifted rapidly into its extreme left-hand position.

In its extreme position, the hydraulic cylinder no longer admits additional fluid so that the pressure in chamber 31 rapidly rises to equal that in groove 11 and no further pressure differential is applied to the piston member 2. The latter is then shifted axially by the force of compressed spring 6 to the left and entrains ram 3 in this direction, the force of fluid within compartment 25 of the piston member 2 holding this ram against the left-hand end of the piston member. During this forward stroke of the ram 3, arm 60 is actuated to step the ratchet wheel 64 and rotate the electrically connected wipers 65 and 66 to energize coil 68 and de-energize coil 69. The valve member 78 is then shifted to the left to reverse the flow of fluid to the hydraulic cylinder 16. The process is then repeated with, however, fluid being fed through conduit 81 of the hydraulic cylinder. The timing of the control unit can be adjusted by regulating the restoring force of spring 6 or the dimensions of the throttle bore 30.

My invention as described and illustrated admits of various modifications apparent to persons skilled in the art without departing from the spirit and scope of the appended claims.

What is claimed is:

1. A control unit for a hydraulic installation wherein a source of fluid under pressure is connectable to a load and valve means is interposed between said source and said load, said control unit comprising:

housing means forming a fluid cylinder;

a piston member reciprocable in said cylinder between a pair of extreme operative positions and subdividing said cylinder into a pair of fluid chambers;

conduit means connecting one of said chambers with said source and the other of said chambers with said load for applying a pressure differential to said piston member to displace the latter within said cylinder from one of said extreme positions into the other extreme position; and transmission means including a ram displaceable with said piston member for connecting said piston member with said valve means for intermittently operating same in accordance with the movement of said piston member.

2. A control unit for a hydraulic installation wherein a source of fluid under pressure is connectable to a load and valve means is interposed between said source and said load, said control unit comprising:

housing means forming a fluid cylinder;

a piston member reciprocable in said cylinder between a pair of extreme operative positions and subdividing said cylinder into a pair of fluid chambers;

conduit means connecting one of said chambers with said source and the other of said chambers with said load for applying a pressure differential to said piston member to displace the latter within said cylinder from one of said extreme positions into the other extreme position;
resilient means in said housing means bearing upon said piston member in a sense opposite the direction of displacement of said piston member from said one position into said other position; and
transmission means including a ram displaceable with said piston member for connecting said piston member with said valve means for intermittently operating same in accordance with the movement of said piston member.

3. A control unit for a hydraulic installation wherein a source of fluid under pressure is connectable to a load and valve means is interposed between said source and said load, said control unit comprising:
housing means forming a fluid cylinder;
a piston member reciprocable in said cylinder between a pair of extreme operative positions and subdividing said cylinder into a pair of fluid chambers;
conduit means connecting one of said chambers with said source and the other of said chambers with said load for applying a pressure differential to said piston member to displace the latter within said cylinder from one of said extreme positions into the other extreme position;
resilient means in said housing means bearing upon said piston member in a sense opposite the direction of displacement of said piston member from said one position into said other position;
adjusting means for varying the force applied by said resilient means to said piston member; and
transmission means including a ram displaceable with said piston member for connecting said piston member with said valve means for intermittently operating same in accordance with the movement of said piston member.

4. A control unit for a hydraulic installation wherein a source of fluid under pressure is connectable to a load and electromagnetic valve means is interposed between said source and said load, said control unit comprising:
housing means forming a fluid cylinder;
a piston member reciprocable in said cylinder between a pair of extreme operative positions and subdividing said cylinder into a pair of fluid chambers;
conduit means connecting one of said chambers with said source and the other of said chambers with said load for applying a pressure differential to said piston member to displace the latter within said cylinder from one of said extreme positions into the other extreme position;
resilient means in said housing means bearing upon said piston member in a sense opposite the direction of displacement of said piston member from said one position into said other position;
adjusting means for varying the force applied by said resilient means to said piston member;
transmission means including a ram displaceable with said piston member for connecting said piston member with said valve means for intermittently operating same in accordance with the movement of said valve member; and
switch means operated by said ram for energizing said electromagnetic valve means to intermittently operate same in accordance with the movement of said piston member.

5. A control unit for a hydraulic installation wherein a source of fluid under pressure is connectable to a load and electromagnetic valve means is interposed between said source and said load, said control unit comprising:
housing means forming a fluid cylinder;
a tubular piston member reciprocable in said cylinder between a pair of extreme operative positions and subdividing said cylinder into a pair of fluid chambers;
throttle means in said piston member for admitting a relatively small flow of fluid from one of said chambers into the other of said chambers, said piston member and said cylinder forming a valve blocking passage of fluid between said chambers at a relatively high rate between said chambers in the other operative position;
conduit means connecting one of said chambers with said source and the other of said chambers with said load for applying a pressure differential to said piston member to displace the latter within said cylinder from said one of said positions into said other of said positions;
resilient means in said housing means bearing upon said piston member in a sense opposite the direction of displacement of said piston member from said one position into said other position;
adjusting means for varying the force applied by said resilient means to said piston member;
transmission means including a ram displaceable with said piston member for connecting said piston member with said valve means for intermittently operating same in accordance with the movement of said piston member; and
switch means operated by said ram for energizing said electromagnetic valve means to intermittently operate same in accordance with the movement of said valve member.

6. A hydraulic installation comprising:
a source of fluid under pressure;
a reciprocable fluid-responsive load operatively connected with said source;
two-position valve means interposed between said load and said source for reversing the flow of fluid to said load, thereby reciprocating same; and
a control unit connectable to said load and said source for periodically operating said valve means, said control unit including:
housing means forming a fluid cylinder;
a piston member reciprocable in said cylinder between a pair of extreme operative positions and subdividing said cylinder into a pair of fluid chambers;
conduit means connecting one of said chambers with said source and the other of said chambers with said load for applying a pressure differential to said piston member to displace the latter within said cylinder from one of said extreme positions into the other extreme position;
resilient means in said housing means bearing upon said piston member in a sense opposite the direction of displacement of said piston member from said one position into said other position;
adjusting means for varying the force applied by said resilient means to said piston member; and
transmission means including a ram displaceable with said piston member for connecting said piston member with said valve means for intermittently operating same in accordance with the movement of said piston member.

7. A hydraulic installation comprising:
a source of fluid under pressure;
a reciprocable fluid-responsive load operatively connected with said source;
two-position electromagnetic valve means interposed between said load and said source for reversing the flow of fluid to said load, thereby reciprocating same; and
a control unit connectable to said load and said source for periodically operating said valve means, said control unit including:
housing means forming a fluid cylinder;
a tubular piston member reciprocable in said cylinder between a pair of extreme operative positions and subdividing said cylinder into a pair of fluid chambers;

throttle means in said piston member for admitting a relatively small flow of fluid from one of said chambers into the other of said chambers, said piston member and said cylinder forming a valve blocking passage of fluid between said chambers at a relatively high rate between said chambers in the other operative position;

conduit means connecting one of said chambers with said source and the other of said chambers with said load for applying a pressure differential to said piston member to displace the latter within said cylinder from said one of said positions into said other of said positions;

resilient means in said housing means bearing upon said piston member in a sense opposite the direction of displacement of said piston member from said one position into said other position;

adjusting means for varying the force applied by said resilient means to said piston member;

transmission means including a ram displaceable with said piston member for connecting said piston member with said valve means; and switch means operated by said ram for energizing said electromagnetic valve means to intermittently operate same in accordance with the movement of said piston member.

8. A hydraulic installation as defined in claim 7 wherein said housing means and piston member are formed with respective edges overlapping in said one of said positions for blocking the flow of fluid at a high rate from said source to said load and spaced apart in said other of said positions for permitting the flow of fluid at a high rate from said source to said load.

9. A hydraulic installation as defined in claim 7 wherein said switch means includes an electromechanical reversing switch adapted to be stepped upon successive advances of said ram.

References Cited by the Examiner
UNITED STATES PATENTS

| 1,025,559 | 5/12 | Bliss | 91—459 |
| 2,721,640 | 6/55 | De Foe | 91—38 |
| 2,808,068 | 10/57 | Thomas | 137—110 |
| 2,962,002 | 11/60 | Hayner | 137—625.64 |
| 2,976,878 | 3/61 | Smilges | 137—110 |

FRED E. ENGELTHALER, *Primary Examiner.*